Nov. 7, 1944.    W. C. DENISON, JR    2,362,054
HYDRAULIC PRESS
Filed Nov. 7, 1941        10 Sheets-Sheet 3

Inventor
William C. Denison, Jr.
By
W. S. McDowell
Attorney

Nov. 7, 1944.   W. C. DENISON, JR   2,362,054
HYDRAULIC PRESS
Filed Nov. 7, 1941    10 Sheets-Sheet 7

Inventor
William C. Denison, Jr.
By W. S. McDowell
Attorney

Nov. 7, 1944.  W. C. DENISON, JR  2,362,054
HYDRAULIC PRESS
Filed Nov. 7, 1941   10 Sheets-Sheet 9

Inventor
William C. Denison, Jr.

By
Attorney

Nov. 7, 1944.  W. C. DENISON, JR  2,362,054
HYDRAULIC PRESS
Filed Nov. 7, 1941  10 Sheets-Sheet 10

Inventor
William C. Denison, Jr.
Attorney

Patented Nov. 7, 1944

2,362,054

UNITED STATES PATENT OFFICE 2,362,054

HYDRAULIC PRESS

William C. Denison, Jr., Columbus, Ohio, assignor to The Denison Engineering Company, Columbus, Ohio, a corporation of Ohio Application November 7, 1941, Serial No. 418,154

14 Claims. (Cl. 86—37)

This invention relates to hydraulic presses, having particular reference to automatic presses of the hydraulically operated and controlled type by means of which materials operated upon by the press are subjected to high compacting forces.

In its more specific aspects, the present invention provides an automatic press mechanism for compressing gun powder, or other similar explosives, in shell casings, it being an object of the invention to provide an efficient, substantially fully hydraulically controlled press for this purpose by which the operations of compacting the explosives in such casings may be safely, expeditiously and conveniently effected.

Another object of the invention resides in the provision of a press having a rotary indexing table adapted for the removable support in spaced circular order of a plurality of explosive-containing shells, the operation of the press being such that through the timed rotation of the table, the shells are registered with one or more hydraulically operated, reciprocatory rams, the operation of the table and said rams being synchronized and interlocked, so that when the table is at rest with certain of the shells or cartridges supported thereby in alignment with the rams, the latter will be actuated to enter the open ends of the shell casings in order to apply high compacting pressures to the explosives contained within said casings, the ram mechanism being then elevated to inactive positions and the table released and partially rotated to align other casings with the ram mechanism.

A further object of the invention rests in a press of this character wherein the operations of the ram mechanism and the rotation or indexing of the shell-carrying table are effected substantially solely through automatic fluid-operated and controlled means, whereby to provide a high capacity press mechanism adapted for operating particularly on explosives and with a high degree of safety for the press operators or attendants.

With these and other objects in view, the invention consists in the combinations of elements and arrangement of parts, as will be more fully described and pointed out in the appended claims.

In the accompanying drawings, wherein a preferred embodiment of the hydraulic press forming the present invention has been illustrated.

Figure 1:
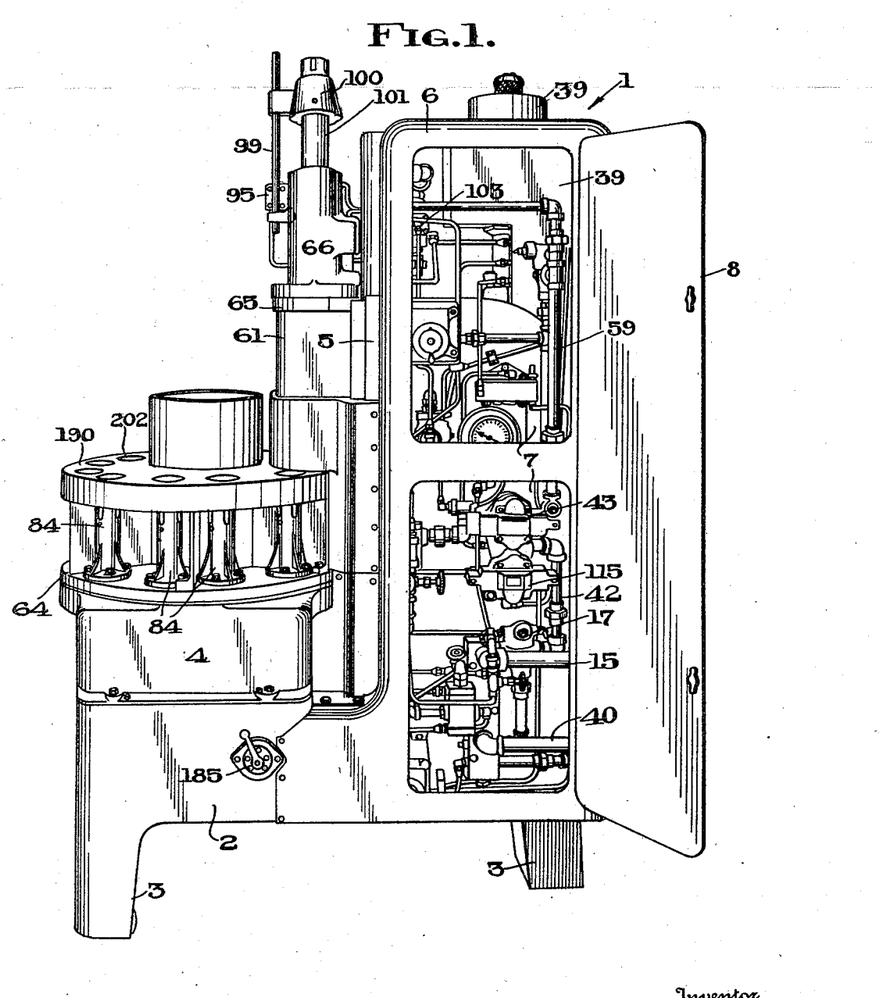
Fig. 1 is a perspective view of the exterior of the press, the door of the press housing being disclosed in an open position to set forth interiorly situated structure.
Figure 2:
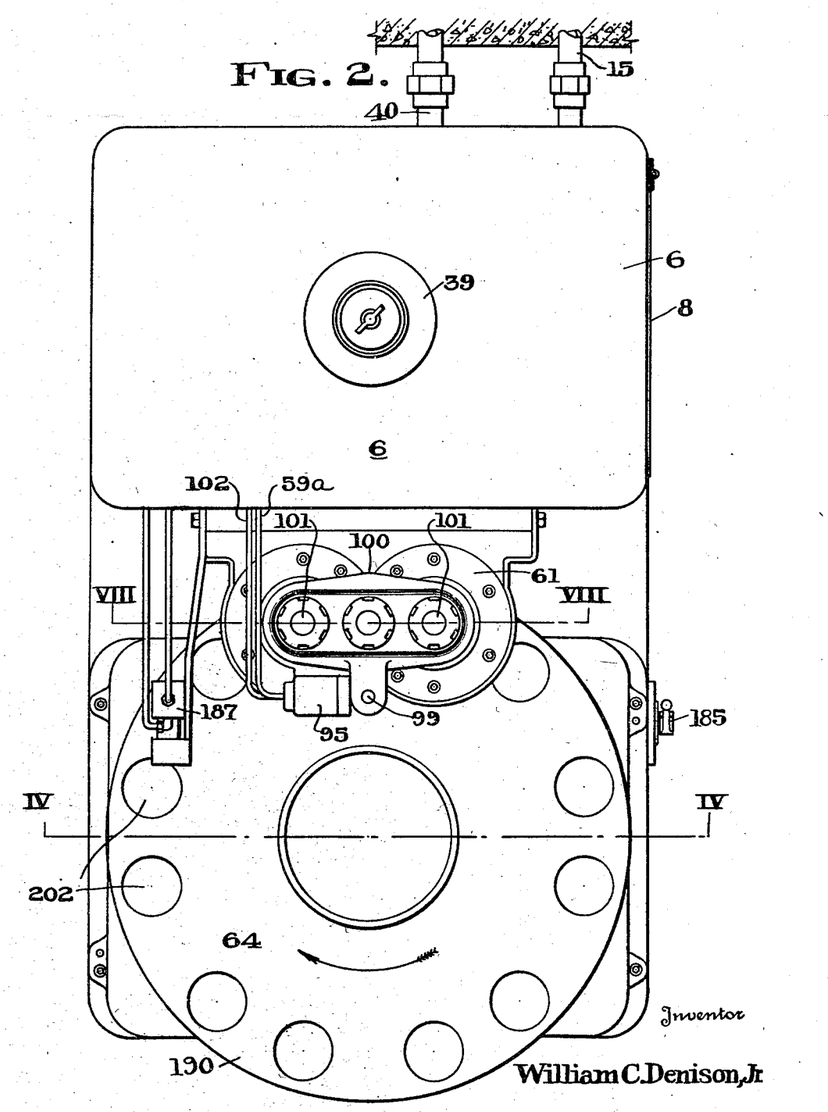
Fig. 2 is a top plan view of the press.

Referring more particularly to the drawings, the numeral 1 designates the improved hydraulic press in its entirety. The same comprises a main frame 2, having floor-engaging legs 3, a table-supporting section 4 and an upright control valve and ram-supporting section or pedestal 5. A housing 6 is suitably connected with said frame, the housing being formed, as shown in Fig. 1, with a plurality of openings 7, which are normally closed by a hinged door 8. When the door is open, the control valve mechanism, mounted on the section 5, is readily accessible for inspection, adjustment and repair.

Figure 3:
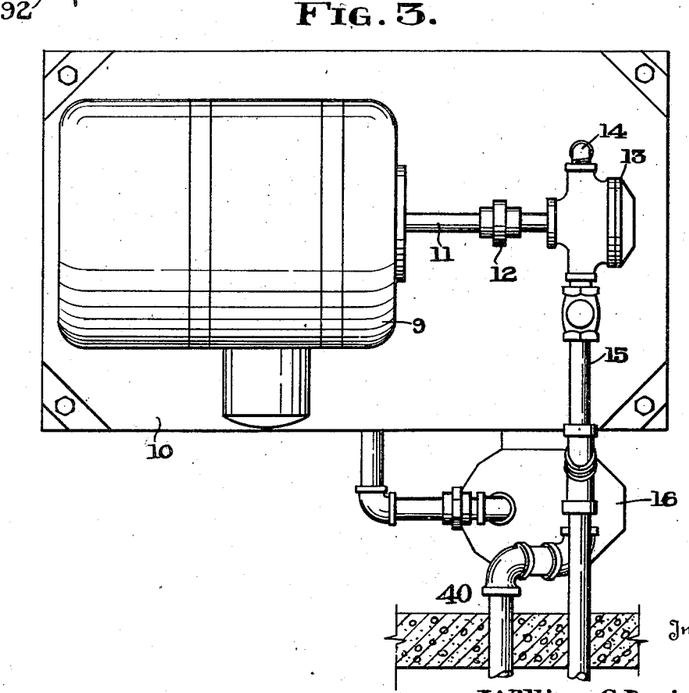
Fig. 3 is a similar view disclosing the fluid tank or reservoir and the motor driven pump mechanism for supplying the press from a remote position with a fluid under pressure.

When the press is employed for the purpose of compacting explosives in shell casings, it is preferably arranged within a walled fireproof enclosure, and, disposed in a remote position from said press, desirably beyond the walls of the enclosure, is an electric motor 9, which latter may be of the so-called explosion-proof type. The frame of the motor is supported on the upper side of a liquid-containing tank 10. The shaft 11 of the motor is joined by means of a flexible coupling 12 with the shaft of a rotary fluid-displacement pump 13. The fluid inlet side of this pump is connected by means of a pipe 14 which extends into the tank 10, so that when the pump is in operation, fluid is withdrawn from the tank, passed through the pump and forced through a high pressure line 15, leading from the outlet side of the pump and extending to the press 1 through the walls of the enclosure or room in which the press is situated. By this arrangement, the electric motor 9 is kept in safe spaced relation from the explosives on which the press may operate. If desired, the tank 10 may be provided with an oil cooler 16, so that the circulating fluid, employed in the operation of the press, may be maintained at desired working temperatures.

Figure 17:
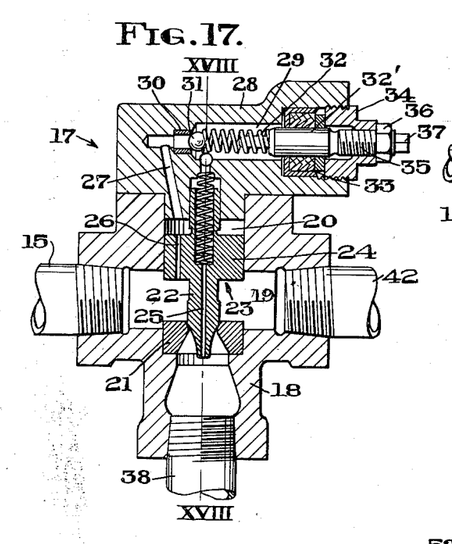
Fig. 17 is a vertical sectional view taken through one of the spring-loaded relief valves employed in controlling the transmission of the working fluid under pressure to the smaller cylinders of the hydraulic ram.
Figure 18:
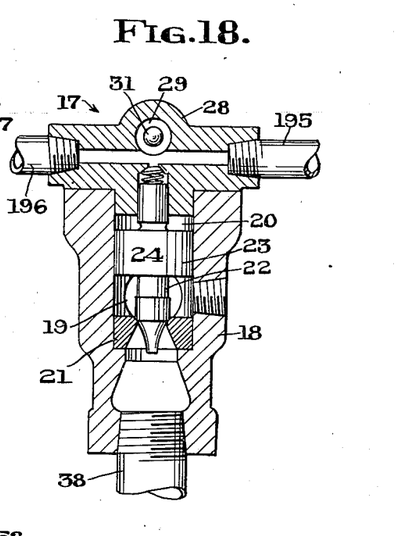
Fig. 18 is a vertical transverse sectional view taken through said relief valve on the plane indicated by the line XVIII—XVIII of Fig. 17.

The pressure line 15 extends to a relief valve 17 of the type disclosed in Figs. 17 and 18. This valve is mounted on the pedestal 5 of the press frame 2 and, as shown (Figs. 17 and 18), comprises a body 18. The latter is formed with a horizontally disposed passage 19 having threaded ends, one of which being adapted for the reception of the line 15. The passage 19 is intersected by a vertically extending bore 20. In this bore, there is positioned a seating ring 21 adapted for engagement with the stem 22 of a piston type valve 23. The piston portion 24 of this valve is slidably mounted in the upper portion of the bore 20, and is formed with a vertically extending axial passageway 25 and with a similarly extending offset second passageway 26 of reduced diameter. Fluid under pressure entering the passage 19 passes under restricted flow conditions through the passageway 26 and thence through an angularly extending port 27 provided in the head 28 of the valve body 18.

The upper end of the port 27 terminates in communication with the reduced inner end of a horizontally disposed passageway 29, formed in the head 28. Positioned in the inner end of the passageway 29 is a seating sleeve 30, with which is normally engaged a ball valve 31. Such engagement is effected by means of a coil spring 32, the latter being arranged in the intermediate portion of the passageway 29 and having one end thereof in contact with the valve 31 and its other end engaged with an adjustable pin 32'. This pin has its unthreaded portion slidably received within a packing 33, formed in the outer end of the passage 29. Also, the outer end of said passageway is threaded for the reception of a nut 34, said nut being internally threaded for engagement with the threads 35 provided on the outer portion of the pin 32. The extreme outer end of the pin 32 is provided with a lock nut 36, to maintain the adjustments of the pin and with a squared tool-receiving end 37. By adjusting the positions of the pin 32, the forces exercised by the spring 32 on the valve 31 may be varied.

Under normal conditions of fluid flow from the pump 13 through the line 15, a restricted amount of fluid passes through the passageway 26 and thence through the port 27. If these pressures should be increased above normal, such increased pressure will result in the unseating of the valve 31, against the pressure exerted by the spring 32, enabling fluid to enter the upper portion of the passageway 25 provided in the upper stem portion of the valve 23, the fluid passing through the passageway 25 and thence to a return pipe connection 38, which leads to a vertical surge tank 39 carried in connection with the section 5 of the frame 2. The bottom of this surge tank is connected by means of a pipe line 40 which extends to the work tank 10, or the oil cooler 16. Also, excess pressures of the oil entering the relief valve 17 are dissipated by the elevation of the piston valve 23, causing the stem 22 of said valve to be removed from engagement with the seating ring 21, thereby allowing a portion of the oil entering the valve 17 to be by-passed through the return connection 38.

Under normal pressures, the fluid from the pump 13 passes by way of the pipe line 15 through the passage 19 of the relief valve and thence flows through a pipe line 42 to a main control valve 43. This valve is formed to comprise a housing consisting of a base plate 44 suitably mounted in a stationary position on the pedestal 5. Mounted on the base 44 is a valve housing 45, see Figs. 19 and 20. The pipe line 42 extends to fluid inlet passages 46 formed in the base 44 and the housing 45, the said passages terminating in approximately the center of the housing. On each side of the inner end of the passage 46, the valve housing includes inner webs 47 formed with horizontally disposed longitudinally aligned ports 48, which are adapted to be opened or closed for fluid flow by the intermediate head 49 of a reciprocatory spool valve 50. The housing 45 further includes integral intermediate webs 51 having ports 52 formed in longitudinal registration with the ports 48.

Figures 19, 20:
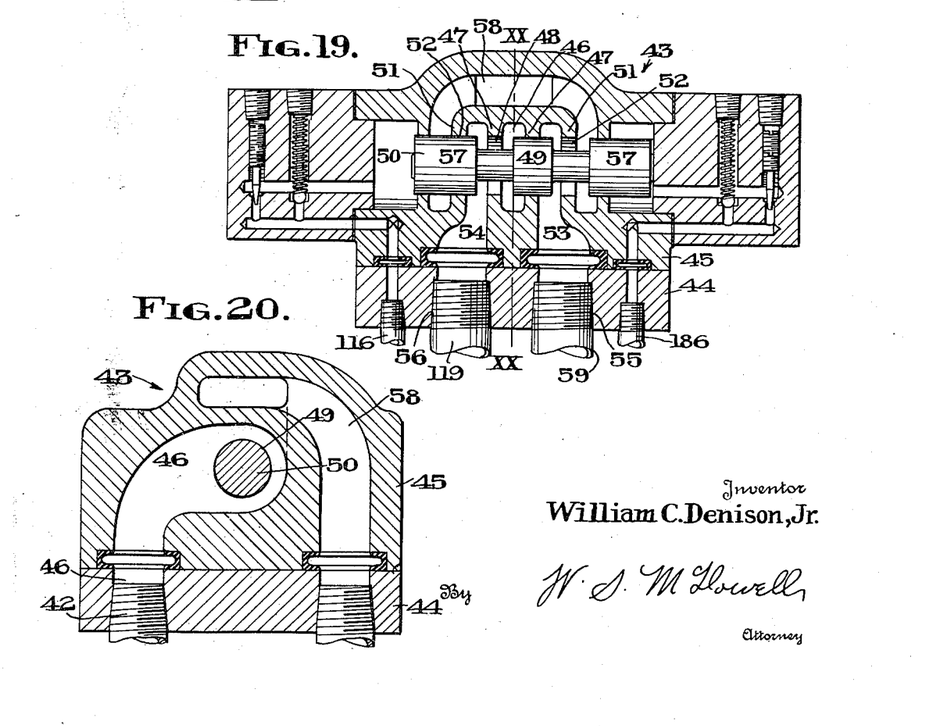
Fig. 19 is a vertical sectional view taken through one of the pilot operated spool valves employed in the transmission of fluid under pressure to the piston cylinders of the ram mechanism.
Fig. 20 is a vertical transverse sectional view taken through said spool valve on the line XX—XX of Fig. 19.

Between the inner webs 47 and the intermediate webs 51, the housing is provided with passages 53 and 54 which extend to threaded pipe-receiving connections 55 and 56, respectively, formed in the base plate 44. Depending upon the operating positions of the intermediate head of the spool valve, the passages 53 and 54 communicate for fluid flow with the inlet passage 46 through the ports 48. Also the spool valve includes outer heads 57 which are adapted to open and close the ports 52, so that the pipe lines 55 and 56 and the passages 53 and 54 may communicate with a fluid outlet passage 58, formed in the housing 45.

Figure 11:
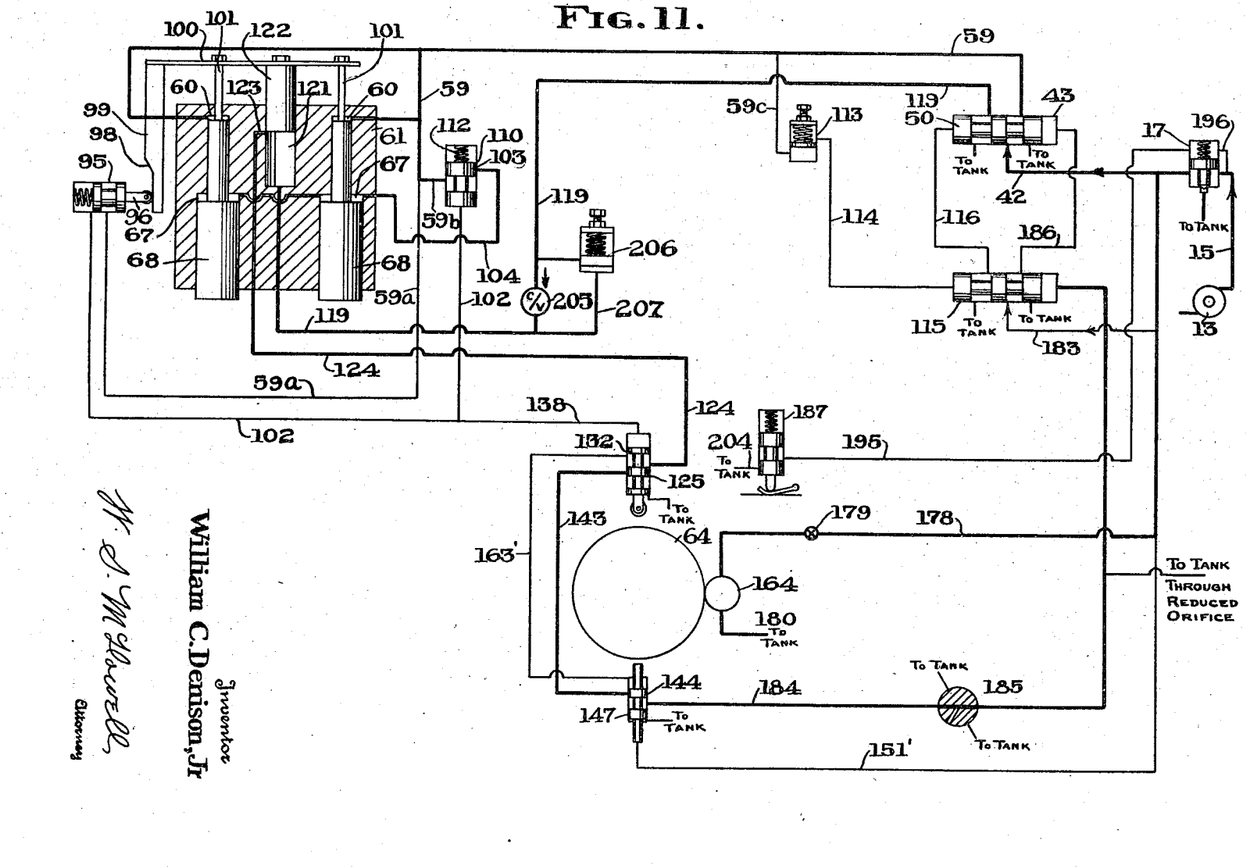
Fig. 11 is a diagrammatic view illustrating the hydraulic circuits employed by the press.

With the spool valve positioned as shown in Fig. 11, fluid under pressure travels from the pipe line 42, through the inlet passage 46, thence through one of the ports 48 into the passage 53, and is then conducted by way of a pipe line 59 into a pair of small diameter cylinders 60 formed vertically in a ram head 61, the latter being mounted on the pedestal 5.

The ram head 61 is mounted on the side of the pedestal 5 above a horizontally disposed, rotatable, work-supporting table 64. In the specific form of the mechanism illustrated, the head 61 comprises a stationary base section 65 and a separable upper section 66. The sections 65 and 66 are formed with vertically registering and axially aligned upper and lower cylinders 60 and 67 respectively, the cylinders 60 being of smaller diameter than the cylinders 67. Slidably mounted in these cylinders are reciprocatory pistons 68, the latter having larger lower ends, which are received within the cylinders 67, and reduced upper ends corresponding to the inner diameter of the cylinder 60. The pipe line 59 communicates with the upper ends of the cylinders 60 by way of the ports shown at 69 in Fig. 8. It will be seen that when the oil or other fluid is admitted under pressure into the upper ends of the cylinder 60, the piston 68 will be caused to travel downwardly.

Figure 8:
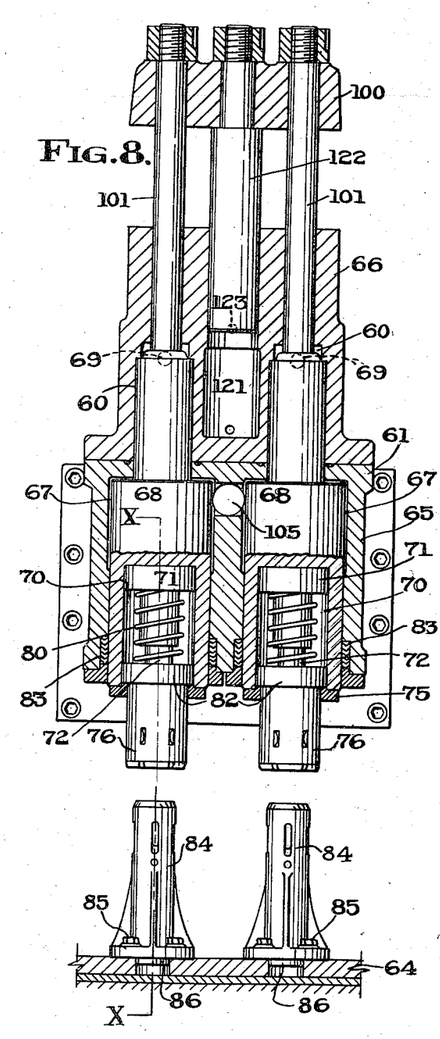
Fig. 8 is a vertical sectional view on the plane indicated by the line VIII—VIII of Fig. 2 disclosing the dual hydraulic ram or punch mechanism.
Figure 9:
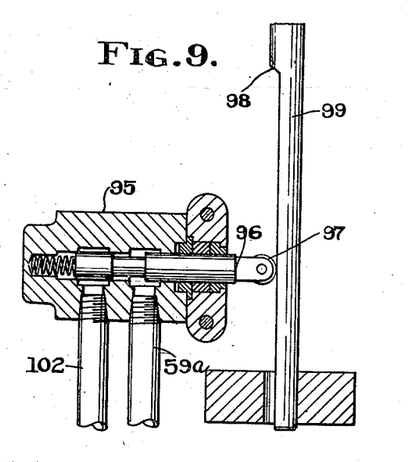
Fig. 9 is a detail view disclosing the ram actuated pilot valve.
Figures 10, 12, 13, 14:
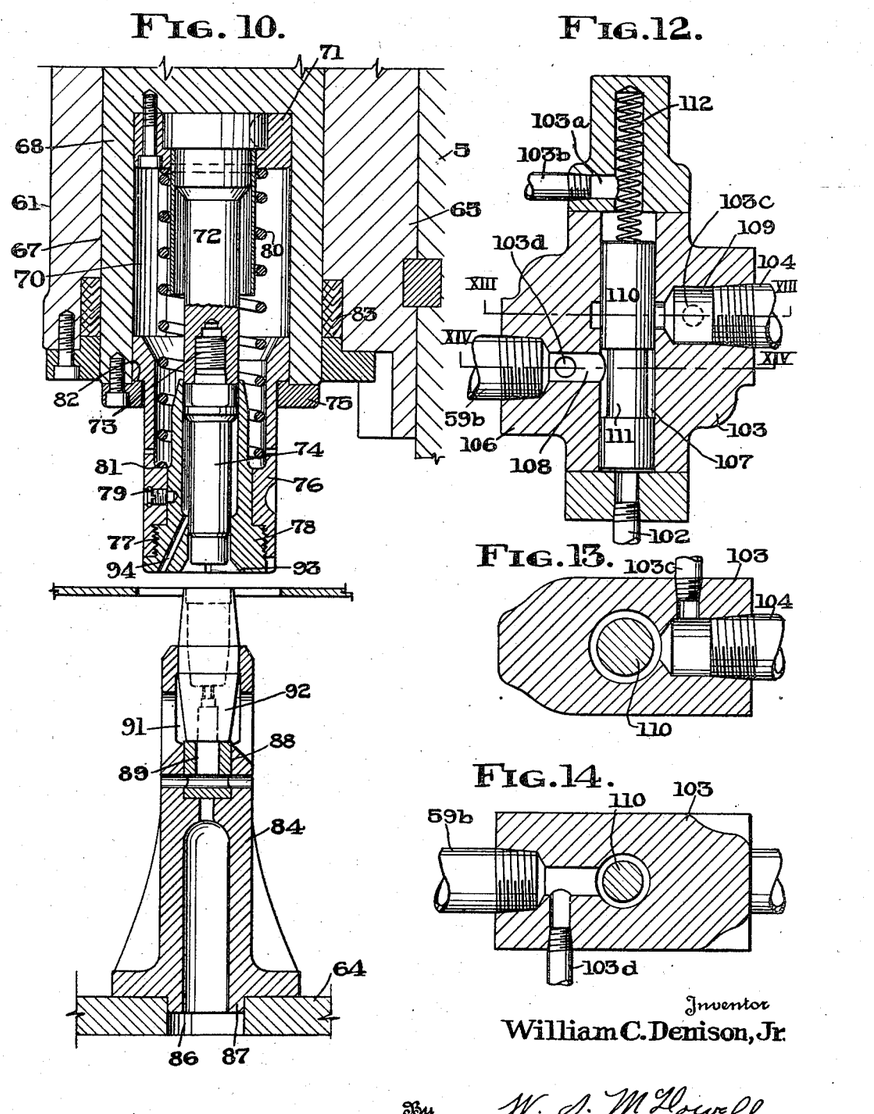
Fig. 10 is an enlarged vertical sectional view on the line X—X of Fig. 8 and illustrating in greater detail the construction of one of the hydraulic rams or punches and an associated table carried shell holder.
Fig. 12 is a vertical sectional view taken through the pilot valve for governing the flow of fluid under pressure to the larger ram cylinders.
Fig. 13 is a horizontal sectional view on the line XIII—XIII of Fig. 12.
Fig. 14 is a similar view on the line XIV—XIV of Fig. 12.

The lower end of each of the pistons 68 is formed with an axially disposed, open-ended chamber 70. Positioned in the upper end of each of these chambers and secured to the piston body is a punch holding ring 71. Each of these rings has keyed thereto the upper end of a punch shank 72, so that said shank will be non-rotatably supported in depending axial relationship within the lower end of the piston. The bottom of the shank is formed with an internal threaded socket for the reception of the reduced threaded end 73 of a punch 74, said punch moving in unison with the piston with which it is connected.

Secured to the lower end of each piston is a retainer ring 75, and adapted to be seated upon this ring for limited sliding movement in each of the chambers 70 is a tubular stripper holder 76. Each holder has threadedly connected therewith, as at 77, a stripper member 78. Each of the holders 76 carries a set screw 79 having the inner end thereof reduced to enter a socket provided in the stripper member, preventing relative movement between each holder and stripper member. A coil spring 80 is confined between a shoulder 81 formed internally of each of the holders 76 and the ring 71, said spring normally serving to maintain an annular external shoulder 82 of said holder in seating engagement with the retaining ring 75. The lower end of each of the cylinders 67 is provided with a packing, as shown at 83 in Fig. 10, for engagement with the side walls of the piston 68.

Mounted in spaced circumferential order on the upper surface of the table 64 is a plurality of work holders 84. Each of these holders consists of a metallic body bolted or otherwise secured as at 85 at its lower end to the table 64. The table is provided in registration with each of the holders with an opening 86 in which is received a centering boss 87 integrally depending from the body of each holder. Toward its upper end, each holder is formed with a socket 88 in which is positioned an insert plug 89. Above the plug 89, each holder has its body formed to include a pocket 91 adapted to removably receive, for example, a powder-containing shell of the character indicated at 92, the shell illustrated being of the 37 mm. type. As the table is induced to rotate, the shells, manually or otherwise positioned in the pockets of said holders, are presented to and vertically aligned with the ram punches 74. Each of the shells contains an explosive in either powdered or pelleted form, and as the punches are lowered, by the admission of fluid under pressure into the cylinders 60 and 67, the profile faces at the lower ends of said punches are brought into engagement with the contents of the shells 92, producing, at the end of the punch stroke, desired compaction of the explosives, pressures of the order of several tons per square inch being usually applied. Following the completion of the pressing operation, the pistons 68 are elevated in a manner to be presently explained, and during such elevation of the pistons, and the withdrawal of the punches connected therewith from the shells 92, the stripper members, through the action of the springs 80, maintain contact with the upper edge portions of the shells and retain the latter in the holder pockets until the punches have been completely withdrawn from the shells.

When the pistons have been substantially fully elevated, and also the punch and stripper members carried thereby, the table 64 is released, as hereinafter described, and an increment of rotary travel imparted thereto in order to present another pair of shells to the action of the ram. During such rotating of the table, the ram is positively maintained and interlocked against a descending operation. Air escape notches 93 are provided in the lower ends of each of the stripper members, and angular vents 94 are also provided in said stripper members to eliminate undesired air compression within the interior thereof.

Forming a continuation of the pipe line 59 is a second pipe line 59a, which extends to a pilot valve 95, suitably supported in connection with the pedestal 5. The actuating stem of this valve is disclosed at 96 and, as shown, is provided with a roller 97 adapted for engagement with a cam 98 formed with a vertically movable rod 99. The upper portion of this rod is connected with a cross head 100, to which the upper ends of the rods 101 of the pistons 68 are connected. After the pistons have descended a predetermined distance, the valve 95 is opened to allow the working fluid under pressure to pass therethrough from the pipe line 59a and to enter a pipe line 102 leading to another pilot valve 103, disclosed in Figs. 11, 12, 13 and 14, said last-named valve being suitably supported in connection with the pedestal 5.

The delivery of fluid under pressure to the valve 103 causes the latter to open, permitting the fluid to flow under pressure through a pipe line 104. This pipe line extends to a port 105, Fig. 8, which communicates with the upper ends of the enlarged lower cylinders 67 of the ram, whereby through this means, an increased fluid pressure will be applied to the pistons after initial movement has been imparted thereto by the admission of fluid under pressure into the upper ends of the smaller cylinders 60, enabling maximum fluid pressures to be applied to and developed on the pistons as the latter encounter increased forces of resistance due to the gradual compaction of the explosives in the shell casings 92.

The pilot valve 103 may comprise a body 106 in which is provided a vertically extending, axially disposed chamber 107. Communicating with the chamber 107 are horizontally disposed passages 108 and 109 arranged in vertically offset relationship, the passage 109 being connected with the pipe line 104. Mounted for sliding movement in the chamber 107 is a cylindrical valve member 110 having formed therein between its ends an annular groove 111. The pipe line 102 enters the lower portion of the body 106 for communication with the bottom of the chamber 107. When the valve 95 is opened, and fluid under pressure passes through the line 102, the valve member 110 is elevated against the resistance of a coil spring 112. Upon completion of it elevating movement, the groove 111 of the valve member 110 will be so located as to establish communication between the passageways 108 and 109. The passageway 108 is joined by a pipe connection 59b with the line 59, so that when said valve member is fully elevated, fluid will flow under pressure from the line 59 through the passageway 108, the groove 111 and thence through the passageway 109 into the pipe line 104, the latter, in turn, transmitting the fluid to the upper ends of the cylinders 67.

When the pistons have been advanced to compress the powder in the shells 92 to the required degree, the pressure in the pipe line 59 builds up sufficiently to open a loaded valve 113, the inlet side of this valve being in communication with the pipe line 59 through a branch 59c. When the valve 113 is opened by the development of the required fluid pressure on its inlet side, fluid passes from the pipe line 59, through the valve 113 and thence through a pilot line 114 to the left side of a reversing valve 115. This valve is of the same construction as the valve shown at 43.

When fluid pressure is applied to the spool type piston of the valve 115 from the pilot line 114, fluid under pressure will pass from the line 42 through branch 183, through said valve and thence into a pipe line 116 leading to the left side of the valve 43, so that the spool piston 50 of the valve 43 will be reciprocated to the right.

When so positioned, Fig. 19, fluid will pass from the valve 43 to the pipe line 119. This line extends to the ram head and enters the lower end of a ram elevating cylinder 121. In this cylinder, there is mounted a sliding piston 122, Fig. 8. The upper end of the piston 122 projects beyond the upper ram section 66 and is joined with the cross head 100. The introduction of fluid under pressure into the cylinder 121, therefore, effects the positive elevation of the piston 122 and, through the medium of the cross head 100, the elevation of the pistons 68.

When the pistons reach approximately the end of their upward travel, the fluid introduced under pressure into the cylinder 121 flows through a port 123, formed in the upper end of the cylinder 121, and which is uncovered by the piston 122 when it reaches substantially its extreme upper position. From the port 123, the working fluid passes into a pipe line 124 which extends to a cam-actuated control valve 125 of the type disclosed in Figs. 15 and 16.

Figure 15:
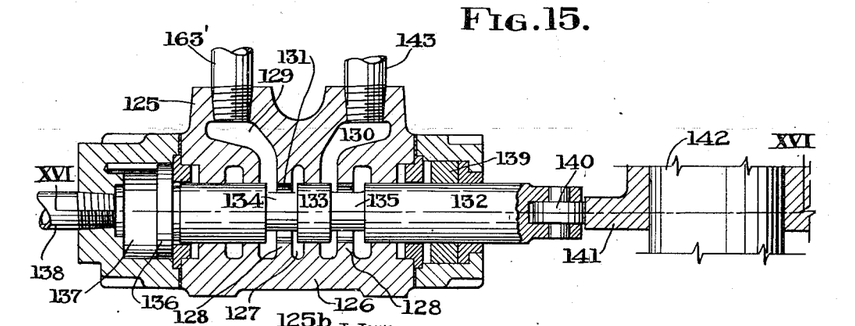
Fig. 15 is a vertical sectional view on the line XV—XV of Fig. 7, illustrating the internal construction of the cam actuated pilot valve.
Figure 16:
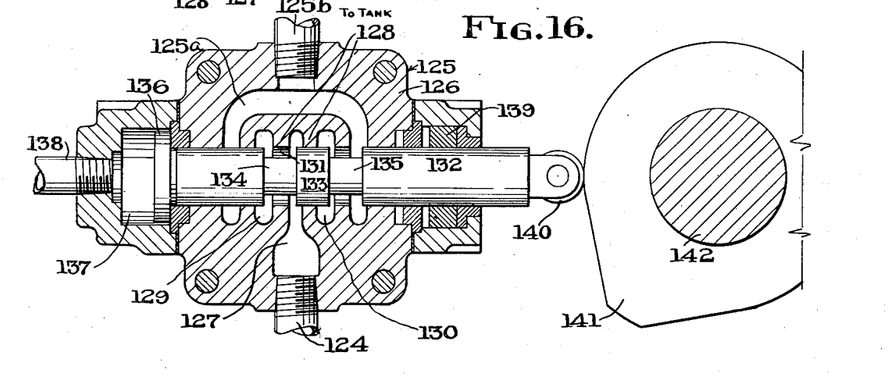
Fig. 16 is a horizontal sectional view on the line XVI—XVI of Fig. 15.

This valve may comprise a body 126, formed with a fluid inlet passage 127, with which the line 124 communicates. The interior of the body 126 is chambered and provided with a plurality of spaced walls or partitions 128, defining spaced fluid outlets 129 and 130. The walls 128 are formed with longitudinally registering ports 131 adapted for the slidable reception of a spool valve 132. This valve is formed with an intermediate head 133 located between annular grooves 134 and 135. One end of the spool valve terminates in a disk 136, which is slidably positioned in a pilot chamber 137, and a pipe line 138, extending from the valve 95, introduces fluid under pressure into the chamber 137 to cause reciprocatory movement of the valve 132 in an outward direction. The outer side of the valve 132 is slidably mounted in a packed bearing 139, and projects beyond the body 126. This projecting end of the valve 132 is bifurcated and provided with a roller 140 which is disposed in engagement with the periphery of a cam 141, mounted for rotation with the driving shaft 142 employed in imparting rotary motion to the table 64. It will be seen that by the provision of the intermediate head 133 of the valve 132, the flow of fluid into either of the outlet passages 129 and 130 may be readily controlled.

Figure 4:
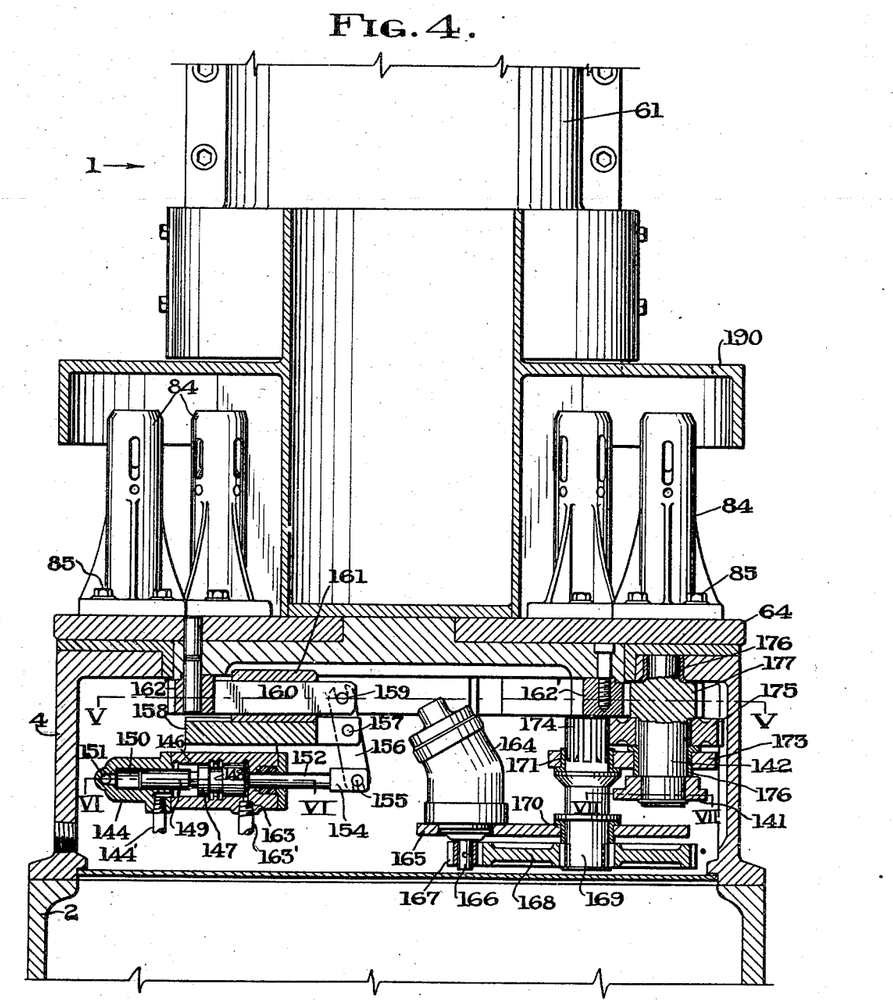
Fig. 4 is a vertical sectional view on the line IV—IV of Fig. 2, disclosing the rotary table of the press and its actuating and controlling mechanism.
Figure 6:
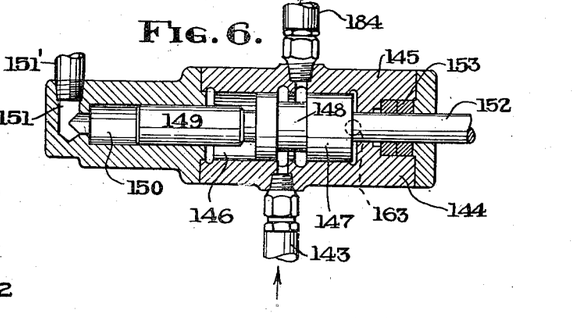
Fig. 6 is a horizontal sectional view on the plane disclosed by the line VI—VI of Fig. 4 and illustrating the valve for controlling the operation of the table locking and releasing mechanism.
Figure 7:
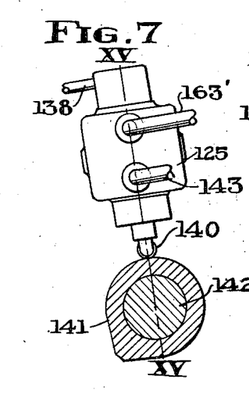
Fig. 7 is a similar view on the plane indicated by the line VII—VII of Fig. 4, illustrating in plan the cam-actuated pilot valve used in connection with the hydraulic table actuating mechanism.

When the valve 125 is actuated to provide for the flow of fluid from the pipe line 124 through said valve by way of the passage 129, the fluid so exiting will pass by way of the pipe line 143 or 163' to a table locking and releasing valve 144, shown in Figs. 4 and 6.

The valve 144 comprises a cylindrical body 145 having a chamber 146 formed therein. Slidably mounted in this chamber is a piston type spool valve 147, the said valve being annularly grooved as at 148. Formed with the valve 147 is a piston 149, which is of smaller diameter than the valve 147 and is slidably received in a bore 150, provided in one end of the body 145. A fluid-admitting port 151 is arranged in the outer end of the bore 150 in order that fluid pressure may be developed within said bore to move the valve 147 outwardly. The fluid under pressure is continuously supplied to port 151 through pipe line 151' which leads from line 42. The other side of the valve 147 carries a rod 152, which projects through a packed bearing 153 and extends beyond the confines of the body 145. The outer end of the rod 152 is provided with a yoke 154 carrying a cross pin 155. Engaged with this pin is the lower slotted end of a link 156, the latter being pivoted intermediate of its length as at 157 in connection with a stationary shelf 158 of the table supporting section 4 of the frame 2. The upper end of the link 156 is slotted to receive a pin 159 carried by the outer bifurcated end of a slidable locking dog 160, the latter being mounted in a bearing 161 formed in connection with the shelf 158. The outer end of the dog 160 is adapted to be engaged with any one of a plurality of circumferentially spaced notches 162 provided in the inner circumference of a gear ring 162' secured to the work table 64. When the dog 160 is positioned in the manner disclosed in Figs. 4 and 5, the table is positively held against rotary movement. The introduction of fluid under pressure through the port 163 of the valve 144 by way of the line 163' from the valve 125, will cause the piston valve member 147 therein to advance in a direction causing the rocking of the link 156 in a manner to remove the dog 160 from engagement with the table notches, thus allowing the table to rotate.

Figure 5:
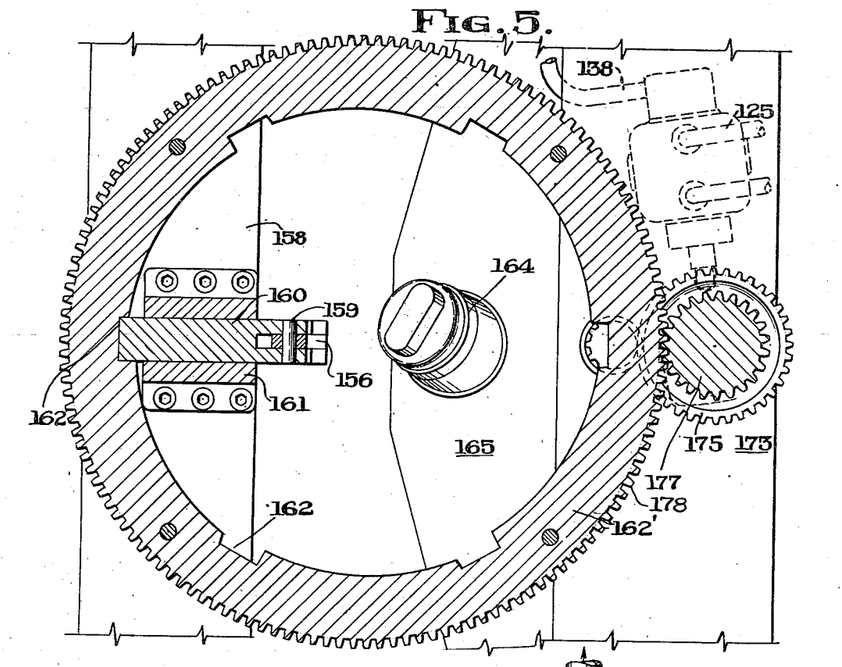
Fig. 5 is a horizontal sectional view on the line V—V of Fig. 4, disclosing the table drive gearing and locking mechanism.

The rotation of the table is effected by means of a hydraulic motor disclosed at 164, the same being mounted on a shelf support 165 provided in the base of the press. The shaft 166 of said motor carries a pinion 167, which, as shown in Fig. 4, rotates an enlarged horizontally positioned gear 168. This gear is keyed to a countershaft 169, the latter being vertically journaled for rotation in a bearing 170 carried by the support 165 and in a corresponding bearing 171 carried by a second shelf support 173. The upper end of the shaft 169 is formed with gear teeth 174, which mesh with a gear 175 fixed on the driving shaft 142 of the table 64. The shaft 142 is vertically journaled in bearings 176, and carries a pinion 177 which, as shown in Fig. 5, meshes with gear teeth 178 formed on the gear ring 162' depending from the circumferential portion of the table 64.

The inlet side of the motor 164 is connected with a pipe line 178 which leads to the pipe line 42, so that when the pump 13 is in operation, oil under pressure, after passing through the relief valve 17, will be constantly delivered to the motor. A manually operated valve 179 may be situated in the pipe line 178 for oil flow regulatory purposes. The discharge side of the motor 164 is joined with a pipe line 180 in communication with the supply tank 10. While fluid pressure is constantly applied to the motor 164 and direct gearing employed between the motor shaft and the table, it will be understood that the motor and table will be restrained against rotation by means of the locking dog 160 during the operation of the pressing ram.

Having thus described the structural mechanism of the press, the operation thereof takes place in the following manner:

*First stage.*—With the electric motor 9 in operation, the rotary pump 13 operates to withdraw fluid from the low-pressure tank 10 and forces the same through the pressure-regulating valve 17, thence by way of the pipe line 42 to the main control valve 43. With the spool member 50 of this valve disposed at the left end of the valve chamber, as illustrated in Fig. 11, oil will pass under pressure from the line 42, through the valve 43 and thence by way of the pipe line 59 to the upper cylinders 60. When oil under pressure from the line 59 is introduced into the upper ends of the smaller cylinders 60, the ram pistons 66 are forced downwardly, so that the punches 74 carried by the lower ends thereof are moved into initial compacting engagement with the compressible material contained in the shells 92, or are advanced, without compaction, into the shells. Since the forces of resistance to the movement of the punches are comparatively low during the initial stages of compression, the pressures developed on the upper ends of the pistons in the small cylinder 60 are sufficient for first stage compression, providing for the controlled descent of the pistons and gradual and regulated compaction of the explosives in the shells.

*Second stage.*—Following a predetermined descent of the pistons, the cam 98 engages with the roller on the stem 96 of the valve 95, moving this valve so that pressure flow therethrough takes place from the lines 59a and 102, thereby elevating the valve member of the pilot operated valve 103. When this valve is opened, fluid from the line 59 is also passed under pressure through the branch line 104 to the upper ends of the lower ram cylinders 67. In this manner, additional fluid pressure is brought to bear on the pistons so that the latter will exert their maximum pressure on the explosives in the shells 92 after initial compression has taken place.

*Third stage.*—When the desired degree of compression of the explosives has been obtained, fluid pressure increase in the line 59 causes the pressure building valve 113 to open. Fluid will then flow from the line 59 through the valve 113 to the left end of the casing, Fig. 11, comprising the reversing valve 115. This causes the spool member in the valve 115 to be advanced to the right. When so positioned, oil, under pressure, passes through a branch line 183, and thence through the valve 115, leaving said valve through the pipe line 116, passing to the left side of the casing of the main valve 43. When this occurs, the spool valve member 50 in the valve 43 is moved to the right, arresting fluid flow under pressure through the line 59, and directing the fluid through the pipe line 119. Fluid is thus advanced to the lower end of the piston-elevating cylinder 121, and since pressure fluid flow through the pipe line 59 has been discontinued, the pistons 66 are moved upwardly by the action of the elevating piston 122 and the cross head 106.

*Fourth stage.*—During these operations on the part of the hydraulic ram, the indexing table 64 is positively held against rotation by the dog 160. However, when the elevating piston 122 has been moved to approximately the limit of its upward travel, the passage 123 is uncovered by said piston to provide for fluid flow through the pipe line 124, the cam operated valve 125 and the lock operating valve 144, the valve 125 having been actuated by fluid under pressure from line 102 and 138 to position its valve member 132 so that pressure fluid flow takes place in the line 163'. This line conducts the fluid under pressure to the port 163 of the valve 144, causing the spool valve 147 therein to move inwardly against the pressure of the fluid in chamber 150. Since the piston 149 is of smaller diameter than the valve 147, the increased effective area of the latter will enable the same to move to the left, displacing fluid from the chamber 150. This movement of the piston valve 147 effects the withdrawal of the locking dog 160 from engagement with the table, thereby causing partial rotation of the table through the operation of the fluid motor 164. The operation of the fluid motor causes the rotation of the shaft 162 and the cam 141. The raised portion of this cam is timed to engage the roller 140 of the valve member 132, moving the latter to arrest flow through the line 163' and establish pressure fluid flow through the line 143. The pressure constantly applied to the valve member 147 by way of the line 151' causes said member 147 to move inwardly when pressure from the line 163' thereon is removed, thus positioning the valve member 147 so that pressure flow takes place from the line 124, valve 125, line 143, through valve 144 and thence into line 184. Fluid flow through the lock valve 144 is effected only when the piston 147 in this valve is positioned to maintain the dog 160 in its table-locking position. From the valve 144, the fluid passes by way of a pipe line 184 through a manually adjusted control valve 185. This valve is formed so that when in one position, a single working cycle of the press will take place, and when in a second position, as in Fig. 11, repeated or multiple cycle operations of the press will be automatically effected. The line 184, after passing through the valve 185, is extended to the right side of the reversing valve 115, so that when the piston 122 is fully elevated, fluid will enter the right side of the valve 115, moving the spool member in the latter to a position so that oil will be forced through a pipe line 186 entering the right side of the casing of the main valve 43, the valve spool 50 being forced to the left to repeat the cycle of operations.

It will be understood that the various control valves of the fluid circulating system of the press and associated pipe lines are completely filled with the operating fluid, the valves being provided with suitable return connections which lead to the tanks indicated at 10 and 34. Thus, as shown in Figs. 19 and 20, the valve 43, and likewise the reversing valve 115, is provided with a fluid outlet port 58 common to the chambers 53 and 54, the passage 58 being connected by a return line leading to the tank 39. The latter is of such height as to maintain oil in the associated valves and pipe lines at all times. The table lock valve 144 is provided, Fig. 4, with a return line 144′, so that oil displaced from the cylinder 146 by the movement of the valve member 147 to the left may be forced toward the tank 39. The cam operated valve 125, Figs. 15 and 16, is provided with the fluid outlet passage 125a, which communicates in common with the passages 129 and 130, depending upon the operating positions of the valve member 132. The passage 125a communicates with a return pipe 125b, leading to the return tank 39.

The pilot valve 103, shown in Fig. 12, has the upper portion of the chamber 107 disposed in communication with an oil outlet port 103a, with which is associated an oil return pipe 103b, which leads to the surge tank. Likewise, the return pipes 103c and 103d are connected, respectively, with the passages 109 and 108 and lead to the tank 39.

Figure 21:
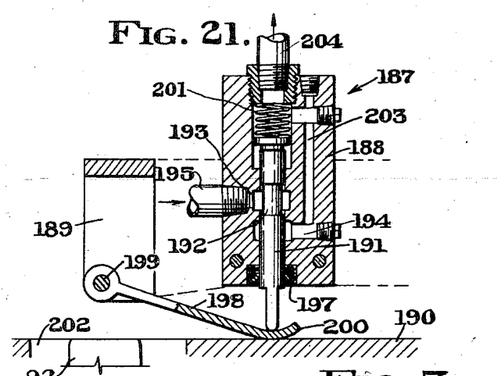
Fig. 21 is a vertical sectional view through a safety remote control device for the relief valve mechanism.

In order to arrest the operation of the press in the event a shell casing 92, or other form of work, should not be positioned in the holders 84, or if such shell casing should be improperly positioned in the holders, as by being disposed out of registration with the pressing rams, a safety valve mechanism 187, Figs. 11 and 21, is provided for arresting operation of the press. This valve comprises a body 188, carried by a bracket 189 on the frame of the press. The outer end of this bracket projects over the perforated upper guard 190 of the table 64. The body 188 is formed with a vertical bore in which is positioned a slidable valve rod 191, the latter being formed with an annular groove 192 which is normally disposed out of registration with fluid inlet and outlet chambers 193 and 194 respectively, formed in the body 188, the chambers being arranged in vertically offset relationship. The chamber 193 is connected by means of a pipe line 195 with the bore 29 in the head of the relief valve 17, the line 195 entering said relief valve as disclosed in Fig. 18. Also entering the head of the relief valve is an open fluid pressure line 196 which is joined with the pressure line 15.

The lower end of the valve rod 191 projects through a packed bearing 197, provided in the valve body 188 and contacts with a lever 198 pivoted as at 199 on the bracket 189. The lower end of the lever 198 is curved as at 200 and is maintained in wiping contact with the upper surface of the table guard 190. Also, the upper end of the valve rod 191 engages with a coil spring 201 which tends to force the valve rod downwardly.

It will be seen that if a shell casing is not positioned in one or more of the holders 84, with the upper portions of such casings projecting into the apertures 202 of the guard 190, the rotation of the table will cause the lever 200 to drop into the openings 202, moving the valve rod downwardly by the action of the spring 201. When moved downwardly under these conditions, the groove 192 of the valve rod registers with the passages 193 and 194, allowing fluid under pressure to pass from the line 195, around the valve rod 191 and into outlet passages 203, the latter being provided in the body 188 and extending to a return pipe 204, leading to the surge tank.

The opening of the valve 188 to allow fluid flow from the pipe 195 to the return connection 204 thereby reduces the fluid pressure on the top of the piston 23 of the relief valve 17, causing the elevation of the valve member 22 and by-passing the pipe line 42 and control valve 43.

The safety features of the press are increased by the provision of means for controlling the descent of the plungers in the pressing operations. As shown in Fig. 11, this controlling means comprises a valve combination which is disposed in the line 119 and includes a check valve section 205 so designed that fluid may flow in a manner substantially unrestricted toward the cylinder 121, there also being a loaded valve section 206 positioned in a by-pass line 207 extending around the check valve 205. The loaded valve is constructed to prevent flow through the by-pass line until a predetermined pressure is developed in the portion of the line 119 leading from the cylinder 121. Such pressure is produced by the movement of piston 122 into the cylinder upon downward movement of the pressing pistons 68.

As the crosshead 100 is rigidly connected to the piston 122 and moves in unison therewith and the pistons 68, through the medium of the rods 101 and nuts carried thereby, are restricted in their downward movement by the cross-head, the pistons 68 can only move at the same rate of speed as the piston 122. Due to the provision of the loaded valve 206, a predetermined resistance to movement of the piston 122 will be offered by the fluid in the cylinder 121. As the crosshead moves at the same rate as the piston 122, the pistons 68 will be caused to move in unison on the downward stroke until the resistance caused by the compaction of the powder in the shell engaged by one or the other plunger retards the movement thereof. The other plunger, if it is unaffected, will be free to continue its movement and will cause the plunger 122 to move further into the cylinder 121. Through the provision of this control mechanism, the plungers are caused to move at the same rate of speed until the work is engaged and a certain pressure developed, at which time the plungers may move at different rates.

After the plungers have completed a pressing operation, fluid is advanced through line 119 without passing through valve 206, the check valve 205 permitting free flow of fluid in this direction.

Without the valve means 205 and 206, it would be possible for one plunger to stick which would cause all the fluid to be delivered to the other plunger and it would move at twice the normal speed. When the plunger struck the powder while traveling at such an excessive speed, an explosion could possibly result. The valve combination thus described is of primary importance in rendering the press safe for use in shell loading establishments.

In view of the foregoing, it will be seen that the present invention provides a fully hydraulically operated press wherein all operations are carried out by means of regulated fluid flow under pressure. The press eliminates the employment of electrically actuated switches or manually operated mechanical controls, so that the press may be used with a high factor of safety in the compressing of explosives particularly, although, of course, it may be used in other operations requiring high pressures. The mechanism of the press functions automatically without the necessity of manual attention other than that required in placing the work into the holders 84 and in removing the work from such holders.

While a preferred form of the invention has been illustrated in the accompanying drawings and described in detail, nevertheless, it will be understood that the structure is subject to considerable modification or variation without departing from the principles and spirit of the invention and, therefore, it is intended that the invention shall include within its purview all such variations falling within the scope of the appended claims.

What is claimed is:

1. In hydraulic press mechanism, a head having a pair of cylindrical chambers, one of said chambers being of greater diameter than the other, a ram piston slidably positioned in said chambers and conforming to the diameters thereof, means operable when the piston is elevated to admit fluid under pressure into the chamber of smaller diameter to produce initial downward movement of the piston, valve mechanism automatically actuated following predetermined downward movement of said piston to admit fluid into the chamber of larger diameter in order to increase the effective fluid pressures applied to said piston, a third cylindrical chamber in said head, a ram-elevating piston slidably positioned in said third chamber and connected with said ram piston for movement in unison therewith, means responsive to a predetermined increase in the fluid pressures applied to said ram piston to arrest the application of fluid pressure thereto and divert the flow of fluid under pressure into said third chamber, effecting the elevation of said pistons, a work supporting-table rotatably mounted beneath said head, fluid pressure means for rotating the table, and a fluid-actuated interlocking mechanism operative to effect the rotation of the table when the pistons are idle and to retain said table against rotation during reciprocation of said pistons.

2. In hydraulic press mechanism, a head having a pair of cylindrical chambers, one of said chambers having a diameter greater than the other, a ram piston slidably mounted in said chambers, a pipe line entering the upper part of the chamber of smaller diameter, means for passing fluid under pressure through said pipe line and into said smaller chamber to effect initial downward movement of said piston, a branch pipe line leading from the first line, a valve having its fluid inlet joined with said branch pipe line, a pilot pipe line leading from the fluid outlet of said valve, a normally closed pilot valve having its fluid inlet disposed in communication with said first fluid pressure line and its outlet connected by a pipe line with the upper part of the larger of said chambers, and means movable in unison with said piston and operable upon predetermined descent thereof to open said first-named valve, whereby to transmit fluid under pressure through said pilot line to the pilot valve, causing the opening of the latter and establishing fluid flow under pressure from said first-named pipe line, through the pilot valve and thence into the upper part of the cylinder of larger diameter.

3. In a hydraulic press, a bed frame, a rotary work table carried by said frame, a fluid-actuated motor, motion-imparting devices driven by said motor for rotating said table, a movable lock member carried by said frame, said member being engageable with the walls of a plurality of circumferentially spaced abutments formed with said table to restrain the latter against rotation, a valve member movably mounted in a casing positioned on said frame, pivot link means connecting said valve member with said lock member, means for admitting fluid under pressure into said casing to maintain said valve and lock members in positions holding said table against rotation, and additional fluid-controlled means counteracting said fluid admitting means for moving said valve and lock members to positions releasing said table for partial rotation.

4. In a hydraulic press, a bed frame, a rotary work table carried by said frame, a fluid-actuated motor, motion-imparting devices driven by said motor for rotating said table, a movable lock member carried by said frame, said member being engageable with the walls of a plurality of circumferentially spaced abutments formed with said table to restrain the latter against rotation, a valve member movably mounted in a casing positioned on said frame, pivot link means connecting said valve member with said lock member, means for admitting fluid under pressure into said casing to maintain said valve and lock members in positions holding said table against rotation, additional fluid-controlled means counteracting said fluid admitting means for moving said valve and lock members to positions releasing said table for partial rotation, a fluid-actuated reciprocatory ram mounted on said frame above said table, and a fluid-responsive interlocking mechanism between said ram and table, said mechanism retaining the table against rotation during reciprocatory movement of the ram and the ram against operation during the incremental rotation of the table.

5. In a hydraulic press, a frame structure, a rotatable work-supporting table carried by said frame structure, a reciprocatory ram movable between active and inactive positions and mounted on said frame structure above said table for engagement with work supported thereby, fluid-controlled means for holding said table against rotation when said ram is actively positioned and causing rotation of said table when said ram is inactively positioned, said means comprising a pipe line through which fluid is passed under pressure when said ram is inactively positioned, a control cylinder having an inlet communicating with said pipe line and spaced first and second fluid outlets, a valve member movably positioned in said cylinder, fluid pressure actuated means operable when said ram is actively positioned for locating said valve member to permit the passage of fluid under pressure through said cylinder by way of the first of said outlets, a table locking cylinder having a valve member movably mounted therein, a dog carried by said frame structure disposed for engagement with any one of a plurality of circumferentially spaced abutments formed with said table to restrain the latter against rotation, motion transmitting devices operated by the movement of the valve member in said locking cylinder to move said dog between table holding and releasing positions, a pipe line extending from the first outlet of said control cylinder to said locking cylinder and operable upon the passage of fluid therethrough under pressure to move the valve member of said lock cylinder to a position releasing said dog from table holding engagement, a fluid motor for rotating said table when the latter is released by said dog, a fluid pressure line entering said lock cylinder and operating to apply fluid pressure to the valve member therein to cause said dog to holdingly engage with a table abutment, and means actuated by the rotation of said table to move the valve member in said control cylinder to a position effecting fluid flow under pressure through the second outlet of the control cylinder and arresting such flow through the first outlet, whereby to relieve the lock cylinder of fluid pressure maintaining the dog associated with the valve member thereof in a table releasing position.

6. In a hydraulic press of the construction specified in claim 5 and further characterized by a pipe line extending from the second fluid outlet of the control cylinder to the lock cylinder for fluid passage through the latter when the valve member in the lock cylinder is positioned to retain the dog actuated thereby in its table holding position, and means operable upon the passage of fluid under pressure through said lock cylinder from the second outlet of the control cylinder to effect the operation of said ram.

7. In a hydraulic press, a bed, a work-supporting table mounted on said bed for rotation about a substantially vertical axis, a fluid-actuated driving motor, motion-transmitting devices driven by said motor for imparting rotary movement to said table, a plurality of circumferentially spaced abutments formed with said table, a movable locking dog engageable with any one of said abutments to restrain said table against rotation, a lock cylinder having a valve member slidably mounted therein, motion-transmitting devices actuated by the movement of said valve member to effect the operation of said dog, means for applying fluid pressure to one end of said valve member to maintain the latter in position causing said dog to engage the table abutments, means for applying a counter-acting fluid pressure to the opposite end of said valve member to move the latter into a position causing said dog to release the table, and means operable upon the rotation of said table to terminate the counter-acting fluid pressure on said valve member.

8. In a hydraulic press, a bed, a work-supporting table mounted on said bed for rotation about a substantially vertical axis, means for rotating said table, a movable locking dog engageable with circumferentially spaced abutments formed with said table, a lock cylinder having a valve member slidably mounted therein, motion transmitting devices actuated by the movement of said valve member to effect the actuation of said dog, means for applying fluid pressure to said valve member to maintain the latter in a position causing said dog to engage the table abutments, means for applying a counter-acting fluid pressure to said valve member to move the latter to a position causing the dog to release the table, and means operable upon the rotation of the table to terminate the counter-acting fluid pressure on said valve member.

9. In a hydraulic press, a bed frame, a head formed with said frame having a pair of vertically aligned communicating cylindrical chambers, the upper of said chambers being of smaller diameter than the lower, a ram piston slidably mounted in said chambers and conforming to the diameters thereof, means for admitting an operating fluid under pressure into the upper chamber to effect initial downward movement of said piston, fluid-responsive means operable during the downward movement of said piston to admit the operating fluid under pressure into the lower of said chambers, a third cylindrical chamber provided in said head, an elevating piston slidably mounted in said third chamber, means for uniting the ram and elevating pistons for unison in their respective chambers, and valve means responsive to a predetermined increase in the pressure of the fluid employed in advancing the ram piston on its down stroke to arrest fluid flow under pressure into the first and second chambers and divert such flow to the bottom of the third chamber, whereby to elevate said pistons.

10. In a hydraulic press, a bed frame, a head formed with said frame having a pair of vertically aligned communicating cylindrical chambers, the upper of said chambers being of smaller diameter than the lower, a ram piston slidably mounted in said chambers and conforming to the diameters thereof, means for admitting an operating fluid under pressure into the upper chamber to effect initial downward movement of said piston, fluid-responsive means operable during the downward movement of said piston to admit the operating fluid under pressure into the lower of said chambers, a third cylindrical chamber provided in said head, an elevating piston slidably mounted in said third chamber, means for uniting the ram and elevating pistons for unison in their respective chambers, valve means responsive to a predetermined increase in the pressure of the fluid employed in advancing the ram piston on its down stroke to arrest fluid flow under pressure into the first and second chambers and divert such flow to the bottom of the third chamber, whereby to elevate said pistons, a rotary work-supporting table carried by said frame below said head, a fluid pressure operated lock normally holding said table against rotation, and fluid conducting means extending from the upper part of said third chamber to said lock and operable upon the elevation of said pistons to transmit fluid to said lock to release said table for rotation.

11. In a hydraulic press of the type set forth in claim 10 and further characterized by the provision of a fluid actuated motor for rotating the table when released by the lock, and valve means actuated during rotation of the table to restore said lock to its normal table-engaging position.

12. In hydraulic press mechanism, a pump for passing a fluid under pressure through a confining pipe line, a main control cylinder having a fluid inlet in communication with said pipe line and spaced first and second fluid outlets, a valve member slidably positioned in said control cylinder for controlling the passage of fluid through said outlets, a pressing ram comprising a head formed with said frame, a pair of vertically aligned communicating cylindrical chambers formed in said head, the lower of said chambers possessing a greater diameter than the upper, a ram piston slidably positioned in said chambers and conforming to the diameters thereof, a pipe line extending from the first outlet of the control cylinder to the upper end of the ram chamber of smaller diameter and operable upon the passage of fluid therethrough under pressure to effect initial downward movement of said piston, a pilot cylinder having a slidable valve member therein, a pilot pipe line extending from the fluid supply pipe line leading to the upper ram chamber to said pilot cylinder, a valve in the pilot pipe line, means actuated by the descent of said piston to mechanically open said last-named valve to provide for the flow of fluid under pressure through the pilot pipe line to said pilot cylinder, whereby to position the valve member in said pilot cylinder to provide for the flow of fluid under pressure into the upper end of the larger of said piston chambers, a third cylindrical chamber in said head, an elevating piston slidably mounted in said third chamber and connected with the piston in the first and second chambers for movement in unison therewith, fluid pressure responsive means for reversing the position of the valve member in said main control cylinder when predetermined fluid pressures are applied to the ram piston during its descending stroke and arresting the application of fluid pressure to the ram piston, and a pipe line extending from the second fluid outlet of said control cylinder to the bottom of said elevating cylinder and through which fluid is passed under pressure to effect the elevation of said pistons.

13. In a fluid actuated press, a stationary head having a pair of working cylinders and an elevating cylinder, a working piston slidably mounted in each of said working cylinders, an elevating piston slidably mounted in said elevating cylinder, a cross member rigidly connected with said elevating piston exteriorly of said head, a rod extending rigidly from one end of each of said working pistons and terminating exteriorly of said head for slidable reception within openings formed in said cross member, abutment elements carried by the upper ends of said rods adapted for normal engagement with the upper surface of said cross member, means for introducing a fluid under pressure simultaneously into the upper ends of said working cylinders to effect forced descent of said working and elevating pistons, a fluid outlet line leading from the lower portion of said elevating cylinder beneath the piston therein, and fluid-flow regulating means in said outlet line controlling the rate of displacement from said elevating cylinder to govern the rate of descent of said pistons, the slidable engagement between said rods and cross member during the descent of said piston providing for movement of one of said working pistons independently of the other when said working pistons operate on work offering varied resistances to their descent.

14. In a fluid-actuated press, a bed frame, a table mounted for rotation on said frame, circumferentially spaced workholders carried by said table, said holders being adapted to receive removable casings containing compressible materials, a head formed with said frame and disposed above said table, a fluid actuated reciprocating ram carried by said head, means for supplying fluid under pressure to said head to cause movement of said ram into compressing engagement with the materials positioned in the holder retained casings, a pressure relief valve disposed in said fluid-supplying means, and auxiliary fluid-flow controlling means cooperative with said relief valve and the holder retained casings of said table for diverting fluid-flow under pressure through said fluid-supplying means to said ram when one or more of the holders do not contain a casing and when such casings do not register with said ram, whereby to arrest automatically the operation of the ram.

WILLIAM C. DENISON, Jr.